July 5, 1960  M. S. MARTIN  2,943,547
FIREARM SUPPORTED CAMERA MOUNT
Filed Nov. 3, 1958  2 Sheets-Sheet 1
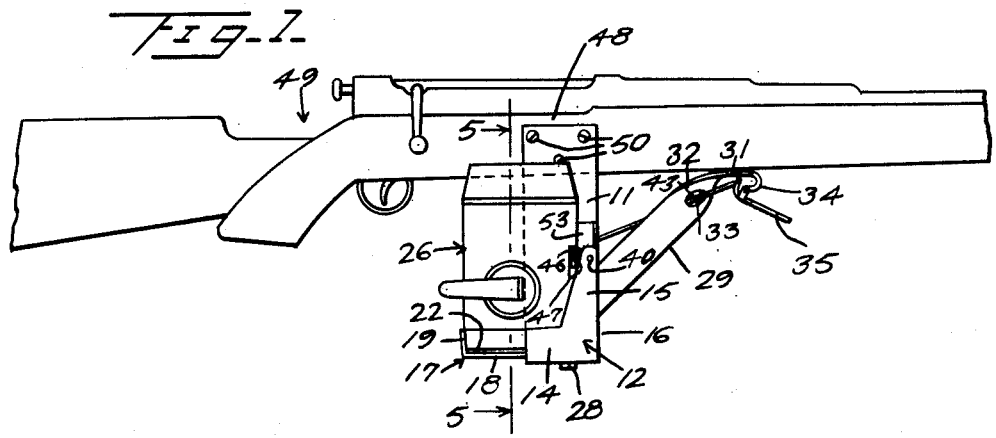
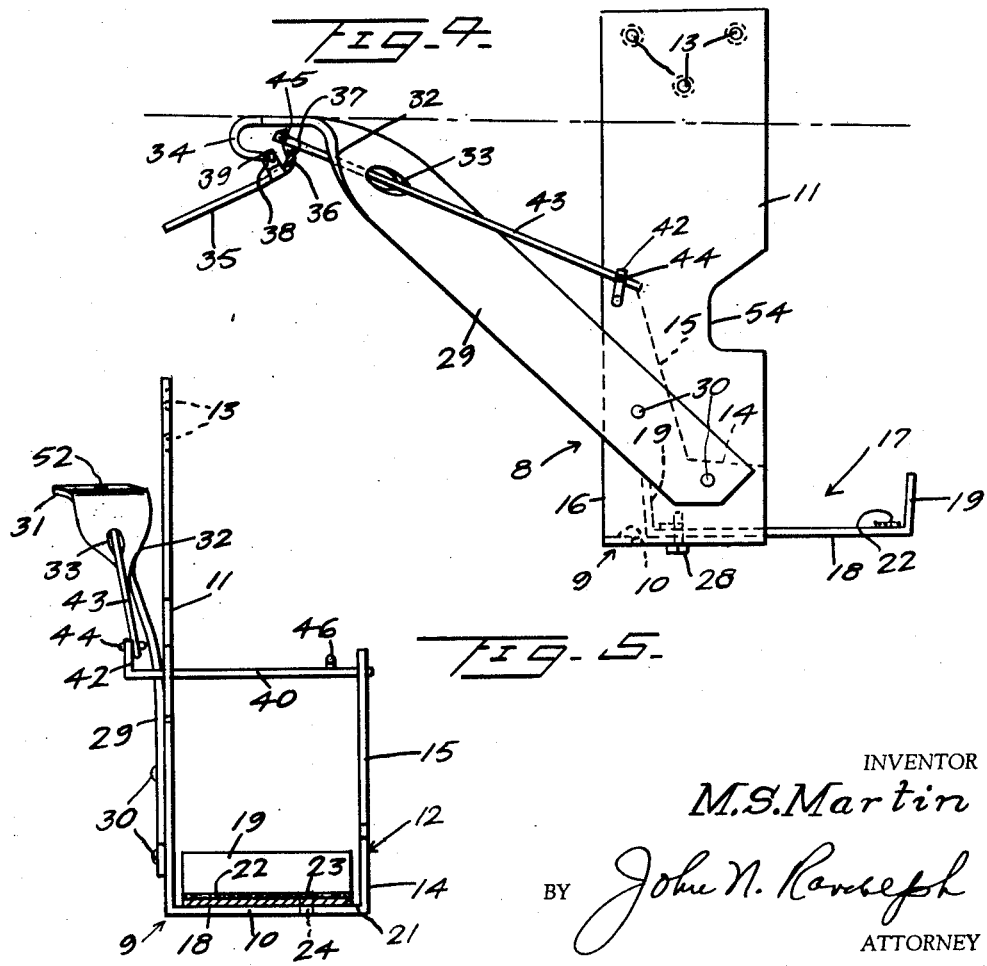
INVENTOR
M.S.Martin
BY John N. Roeseph
ATTORNEY July 5, 1960
M. S. MARTIN
2,943,547
FIREARM SUPPORTED CAMERA MOUNT
Filed Nov. 3, 1958
2 Sheets-Sheet 2
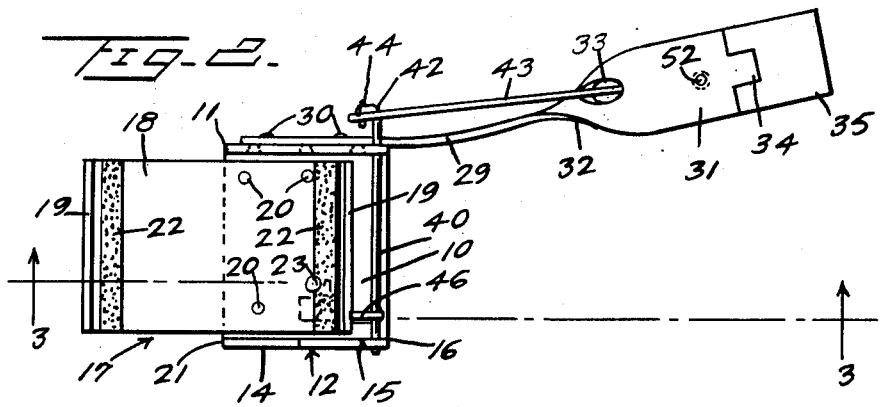
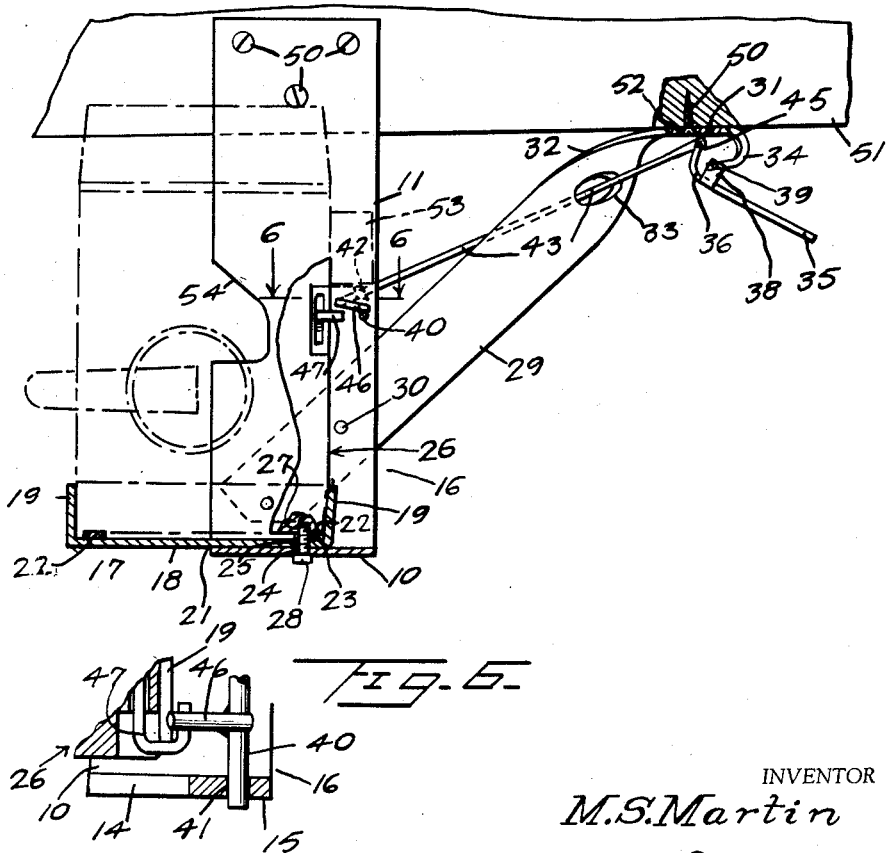
INVENTOR
M. S. Martin
BY John N. Randolph
ATTORNEY United States Patent Office 2,943,547
Patented July 5, 1960

2,943,547

FIREARM SUPPORTED CAMERA MOUNT

Marian S. Martin, 6024 Linden Lane, Amarillo, Tex.

Filed Nov. 3, 1958, Ser. No. 771,569

4 Claims. (Cl. 95—12)

This invention relates to a camera mount of extremely simple construction which may be readily attached to a firearm of the type which is fired from the shoulder for supporting and actuating a camera while the firearm is held in a firing position.

More particularly, it is an aim of the present invention to provide a camera mount which may be readily utilized with a camera and firearm by a hunter, to enable the user to operate the camera at the same time that the firearm is being aimed and fired at game for photographing the game immediately prior to, simultaneously with and subsequent to shooting the game.

More particularly, it is an aim of the present invention to provide a camera mount for supporting a motion picture camera on a hunting rifle and having means whereby a camera can be conveniently operated by a part of the hand which normally engages and supports the rifle forwardly of the trigger, to enable a hunter to take motion pictures of a hunt at the same time that he is aiming and firing the rifle at the game, in a manner so that operation of the camera will not interfere with normal aiming and firing of the rifle.

Still a further object of the invention is to provide a camera mount for supporting a camera in a fixed position relative to a firearm and so that the camera will be accurately pointed at the target at which the firearm is aimed.

Various other objects and advantages of the invention will hereinafter become more fully apparent from the following description of the drawings, illustrating a presently preferred embodiment thereof, and wherein:

Figure 1 is a side elevational view of a portion of a right hand side of a rifle showing the camera mount applied thereto and supporting a conventional motion picture camera;

Figure 2 is a top plan view of the camera mount, and on an enlarged scale;

Figure 3 is a longitudinal sectional view thereof, partly broken away, taken along the line 3—3 of Figure 2 and showing a part of the firearm to which the mount is applied and showing a portion of the camera applied to the mount;

Figure 4 is a side elevational view looking toward the inner side of the camera mount, or in the opposite direction to Figure 1, with a portion of the camera mount shown in section;

Figure 5 is an enlarged transverse sectional view of the camera mount, taken substantially along a plane as indicated by the line 5—5 of Figure 1, and Figure 6 is an enlarged fragmentary horizontal sectional view, taken substantially along a plane as indicated by the line 6—6 of Figure 3.

Referring more specifically to the drawings, the camera mount in its entirety is designated generally 8 and includes a rigid substantially U-shaped body member or support 9 having a substantially flat bottom portion 10 and upstanding substantially parallel side members 11 and 12. The inner side member 11 extends upwardly to substantially above the upper end of the outer side member 12 and has its upper portion provided with fastening receiving apertures 13. The outer side member 12 has a lower portion 14 of approximately the same width as the inner side member 11 and the bottom 10 and has an upper portion 15 of restricted width and which is located adjacent the open front 16 of the body portion or support 9.

A camera supporting base, designated generally 17, includes an elongated substantially flat bottom 18 having upturned ends 19. The forward portion of the bottom 18 rests upon the bottom 10 and is secured immovably thereto by fastenings 20, as seen in Figure 2. The base 17 extends outwardly from the open rear side 21 of the body member or support 9. Cushioning strips 22 are secured to and extend across the ends of the bottom 18. The forward cushioning strip 22 has an arcuate notch 23 which aligns with aligned openings 24 and 25 in the bottoms 10 and 18, as best seen in Figure 3.

The base 17 is of a proper size to accommodate therein the lower portion of a conventional type motion picture camera 26, the bottom of which rests upon the cushioning strips 22. The openings 24 and 25 are disposed to align with the downwardly opening threaded socket 27 of the camera. A setscrew 28 extends upwardly through and is loosely disposed in the openings 24 and 25 and the notch 23 and is threadedly secured in the socket 27 for securing the lower portion of the camera 26 snugly in the base 17, to thereby rigidly mount the camera on the camera mount 8. The size of the base 17 can be varied to accommodate cameras of different sizes.

The lower end of an arm 29 is secured to the exterior face of the longer upright side 11 by fastenings 30, and at an incline, so that the arm 29 extends upwardly from the forward side 16 of the support 9. The arm curves away from the support 9 and is twisted and curved to provide a top portion 31 which is disposed substantially parallel to the support bottom 10. The twisted part 32 of the arm 29 has an elongated opening 33. The upper end portion 31 of the arm 29 has a restricted extension 34 which is curved downwardly and back upon itself.

A substantially flat plate forming a trigger 35 has a restricted extension 36 projecting from an inner end thereof and which has an upturned bifurcated free end 37. The other end of the trigger extension 36, which is disposed adjacent the trigger 35, has upwardly projecting ears 38 which project from the side edges of the extension 36 and which have free end portions loosely straddling the terminal of the turned back extension 34 and which are pivotally connected thereto by a pivot pin 39, for swingably mounting the trigger 35 on the turned back extension 34. The trigger 35 is disposed beneath said extension 34 and normally extends downwardly and forwardly therefrom at an incline, as seen in Figures 1, 3 and 4.

A shaft 40 is journaled in aligned openings 41 of the side member 11 and the portion 15 of the side member 12. The shaft 40 extends through the side member 11 above and adjacent a part of the arm 29 and is located in close proximity to the open front 16 of the support 9. The shaft 40 has a right angularly bent end forming a crank 42 which is disposed outwardly with respect to the side 11 and which normally extends upwardly and slightly rearwardly, as best seen in Figure 4. One end of a rigid connecting rod 43 is pivotally connected by a pivot pin 44 to the crank 42. The connecting rod 43 extends upwardly and forwardly from the crank 42, loosely through the opening 33, and has an upper, forward end loosely disposed in the bifurcated portion 37 and pivotally connected to the trigger extension 36 by a pivot pin 45. A small spur or finger 46 is fixed to the shaft 40, between the upright sides 11 and 12, and extends rearwardly therefrom and is normally disposed with its free end above and spaced slightly from the operating lever 47 of the camera 26. A part of the connecting rod 43 normally bears against the upper end of the opening 33 for supporting the trigger 35, inclined downwardly and forwardly, as seen in Figure 3, and for supporting the crank 42 in a position extending upwardly and slightly rearwardly from the shaft 40, and the finger 46 extending rearwardly and inclined slightly upwardly so as to be out of engagement with the camera lever 47.

The upper end of the member 11 is adapted to be disposed with its exterior face against the right hand side of a part of the receiver 48 of a firearm 49, and is secured thereto by screw fastenings 50 which extend through the openings 13 and are anchored in the receiver portion 48. Thus, the support 9 constitutes a hanger support of which the side 11 constitutes the hanger bar, and the camera 26 is supported outwardly offset from the right hand side of the firearm 49 by the camera mount 8. The upper arm portion 31 bears against a part of the underside of the forearm 51 of the piece 49 and is preferably secured thereto by another screw fastening 50 which extends upwardly through an opening 52 in the arm portion 31. With the arm 29 thus secured to the forearm 51, said arm forms a brace for the hanger support 9. However, it is not essential that the upper portion of the arm 29 be thus anchored to the forearm 51.

The shaft 40 extends across the front of the camera 26 beneath and adjacent the lens barrel 53. Parts of the support 9 may be provided with recesses or notches for accommodating parts of cameras of different makes, as for example, a rearwardly opening notch 54 may be provided in the hanger bar 11 for accommodating a part of the camera 26.

The firearm 49 is illustrated as a rifle but may be any other weapon fired from the shoulder. The support 9 is so positioned that the trigger 36 will be disposed immediately behind and beneath the part of the forearm 51 which is gripped with the left hand for steadying the rifle and so that the fourth or third and fourth fingers of the left hand, while gripping the forearm 51, may be disposed for manipulating the trigger 35. The mount 8 supports the camera 26 so that the lens barrel 53 thereof is directed toward the target at which the firearm 49 is aimed. Consequently, assuming that the piece 49 is being used for hunting, the hunter while holding the piece 49 in a conventional manner for tracking, aiming and firing at game can also operate the camera 26 by merely exerting an upward pressure on the trigger 35 of the camera mount. Such an upward pressure causes the trigger to swing upwardly about its pivot 39. The connecting rod 43 is thus displaced rearwardly for rocking the crank 42 downwardly and rearwardly to turn the shaft 40 in a direction for swinging the spur or finger 46 downwardly. Downward swinging movement of the spur or finger 46 depresses the camera lever 47 to effect operation of the camera 26. The camera 26 is maintained in operation in a conventional manner, so long as the lever 47 thereof is held depressed. When pressure is released on the trigger 35, the weight of said trigger will cause it to swing downwardly and back to its position of Figures 1, 3 and 4 to return the crank 42 and spur or finger 46 back to the positions thereof as seen in Figure 3, to permit the lever 47 to rise and stop operation of the camera 26.

It will thus be seen that a hunter can take motion pictures of the game being hunted without interfering with the normal operation of the firearm, to obtain motion pictures of the game as it is tracked with the weapon and as it is fired upon.

The mount 8 as illustrated and described is intended for use by a person firing the piece 49 from the right shoulder. If the piece is fired from the left shoulder, the structure of the mount would be reversed so that it could be secured to the other, left hand side of the receiver 48.

Various other modifications and changes are contemplated and may be resorted to without departing from the function or scope of the invention as hereinafter defined by the appended claims.

I claim as my invention:

1. A camera mount comprising a hanger support including a hanger bar, means adapted to secure an upper end of said hanger bar to a part of a firearm, forwardly of the firearm trigger, means for detachably securing a camera in said hanger support for mounting the camera beneath and to one side of the firearm, an arm fixed to and extending from a part of the hanger support and disposed to one side thereof and of the camera, a trigger, means pivotally mounting said trigger on said arm for swinging movement about a horizontal axis, a shaft journaled in said hanger support, a finger fixed to said shaft and having a free end portion adapted to overlie an operating lever of the camera, and link and lever means connecting said shaft and trigger for swinging the finger downwardly to depress the camera operating lever when the trigger is swung upwardly, said trigger being supported by the arm at a point spaced longitudinally relative to the firearm from said hanger support and in a position to be engaged and actuated by the fingers of the hand supporting the firearm forwardly of the trigger.

2. A camera mount comprising a hanger support including a hanger bar, means adapted to secure an upper end of said hanger bar to a part of a firearm, forwardly of the firearm trigger, means for detachably securing a camera in said hanger support for mounting the camera beneath and to one side of the firearm, an arm fixed to and extending from a part of the hanger support and disposed to one side thereof and of the camera, a trigger, means pivotally mounting said trigger on said arm for swinging movement about a horizontal axis, a shaft journaled in said hanger support, a finger fixed to said shaft and having a free end portion adapted to overlie an operating lever of the camera, and link and lever means connecting said shaft and trigger for swinging the finger downwardly to depress the camera operating lever when the trigger is swung upwardly, said hanger support being substantially U-shaped, said hanger bar constituting an inner side of the hanger support, said hanger support having an open front and an open rear and including a substantially flat transversely extending bottom, and a base supported on and secured to said hanger support bottom and having a part projecting outwardly from the open rear side of the hanger support, said base being adapted to receive the bottom portion of the camera, said means securing the camera extending upwardly from the base for detachably anchoring the camera therein.

3. A camera mount comprising a hanger support including a hanger bar, means adapted to secure an upper end of said hanger bar to a part of a firearm, forwardly of the firearm trigger, means for detachably securing a camera in said hanger support for mounting the camera beneath and to one side of the firearm, an arm fixed to and extending from a part of the hanger support and disposed to one side thereof and of the camera, a trigger, means pivotally mounting said trigger on said arm for swinging movement about a horizontal axis, a shaft journaled in said hanger support, a finger fixed to said shaft and having a free end portion adapted to overlie an operating lever of the camera, and link and lever means connecting said shaft and trigger for swinging the finger downwardly to depress the camera operating lever when the trigger is swung upwardly, said arm having one end secured to the hanger bar adjacent a lower end thereof and including a part spaced from said end and adapted to bear against the underside of a portion of the firearm, spaced longitudinally from the hanger support, and means detachably securing said arm portion to the firearm for bracing the hanger support.

4. A camera mount comprising a hanger support including a hanger bar, means adapted to secure an upper end of said hanger bar to a part of a firearm, forwardly of the firearm trigger, means for detachably securing a camera in said hanger support for mounting the camera beneath and to one side of the firearm, an arm fixed to and extending from a part of the hanger support and disposed to one side thereof and of the camera, a trigger, means pivotally mounting said trigger on said arm for swinging movement about a horizontal axis, a shaft journaled in said hanger support, a finger fixed to said shaft and having a free end portion adapted to overlie an operating lever of the camera, and link and lever means connecting said shaft and trigger for swinging the finger downwardly to depress the camera operating lever when the trigger is swung upwardly, said arm having a part forming an abutment engaged by a part of said link and lever means for limiting downward swinging movement of the trigger and upward movement of said finger, said trigger being swung downwardly by gravity for elevating the finger.

References Cited in the file of this patent

UNITED STATES PATENTS 2,664,797    Thrasher _____ Jan. 5, 1954

FOREIGN PATENTS 12,613    Great Britain _____ Aug. 12, 1890